United States Patent [19]

Nelson

[11] 4,094,623
[45] June 13, 1978

[54] DOUGH DISPENSING AND SUPPORT APPARATUS

[76] Inventor: Jacob T. Nelson, 105 W. Lee Rd., Taylors, S.C. 29682

[21] Appl. No.: 754,335

[22] Filed: Dec. 27, 1976

[51] Int. Cl.² .............................................. A21C 5/00
[52] U.S. Cl. ..................................... 425/227; 99/354; 425/238; 425/241
[58] Field of Search ............... 425/238, 241, 239, 240, 425/227, 228, 229, 288, 287; 99/354, 353

[56] References Cited

U.S. PATENT DOCUMENTS

| | | | |
|---|---|---|---|
| 545,636 | 9/1895 | McKay | 425/241 |
| 2,144,908 | 1/1939 | Arntzen | 99/354 |
| 2,256,617 | 9/1941 | Kipnis | 425/376 R X |
| 2,568,252 | 9/1951 | Pointon | 425/241 |
| 2,966,126 | 12/1960 | Adams | 425/288 |
| 3,022,722 | 2/1962 | Arvan | 99/354 |
| 3,605,643 | 9/1971 | Barr | 425/241 |
| 3,658,013 | 4/1972 | Neumann et al. | 425/238 |

FOREIGN PATENT DOCUMENTS 314,510   5/1933   Italy ..................................... 425/238

Primary Examiner—Francis S. Husar
Assistant Examiner—William R. Briggs
Attorney, Agent, or Firm—Bailey, Dority & Flint

[57] ABSTRACT

A dough dispensing device and support is illustrated including a rotatable molding means having axially spaced dough receiving cavities formed therein with a stationary separator therebetween to facilitate rapid dispensing of molded dough configurations. A support for the dough dispenser has a pair of pivotal connections between the dough dispenser and a stationary support surface so that the dough dispenser may be maneuvered upwardly for clearing the side of a cooking compartment to which the dough is to be dispensed and subsequently pivoted to a lowered position closely above the surface of the cooking medium contained in the cooking compartment for safely and rapidly dispensing a plurality of dough masses without splashing of the cooking medium.

14 Claims, 5 Drawing Figures

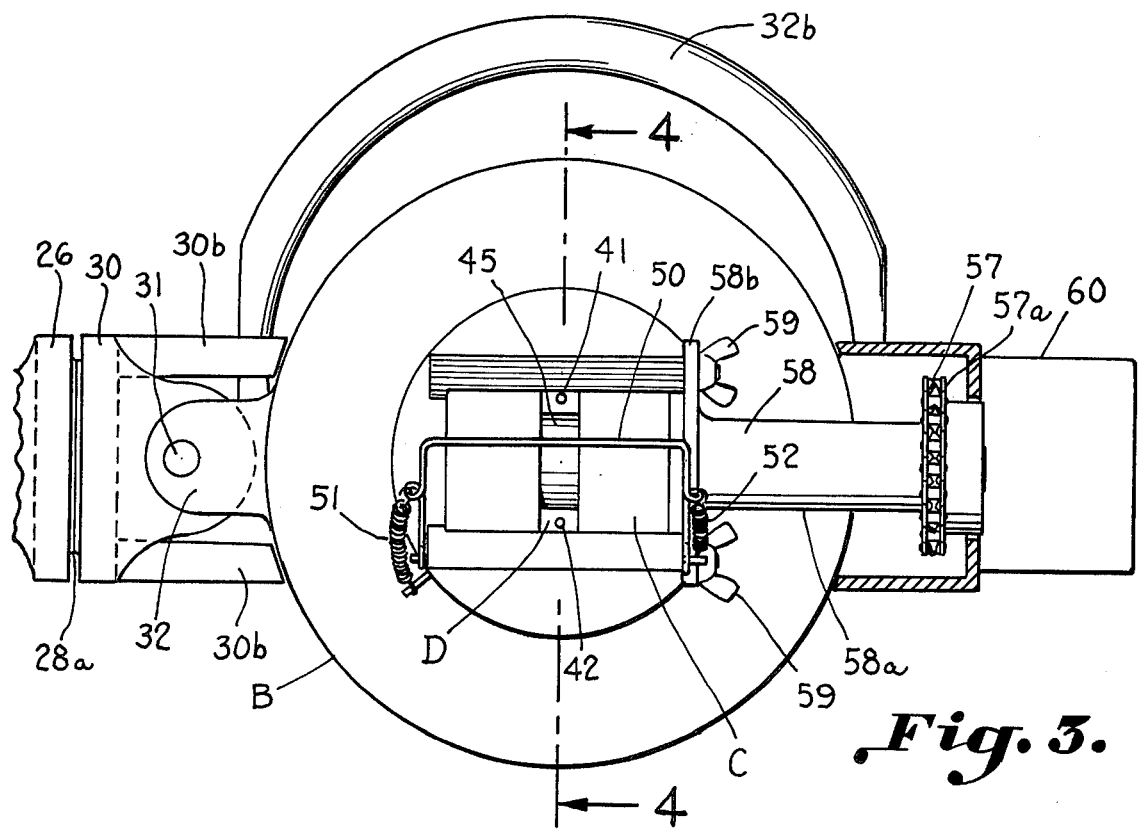
Fig. 3.
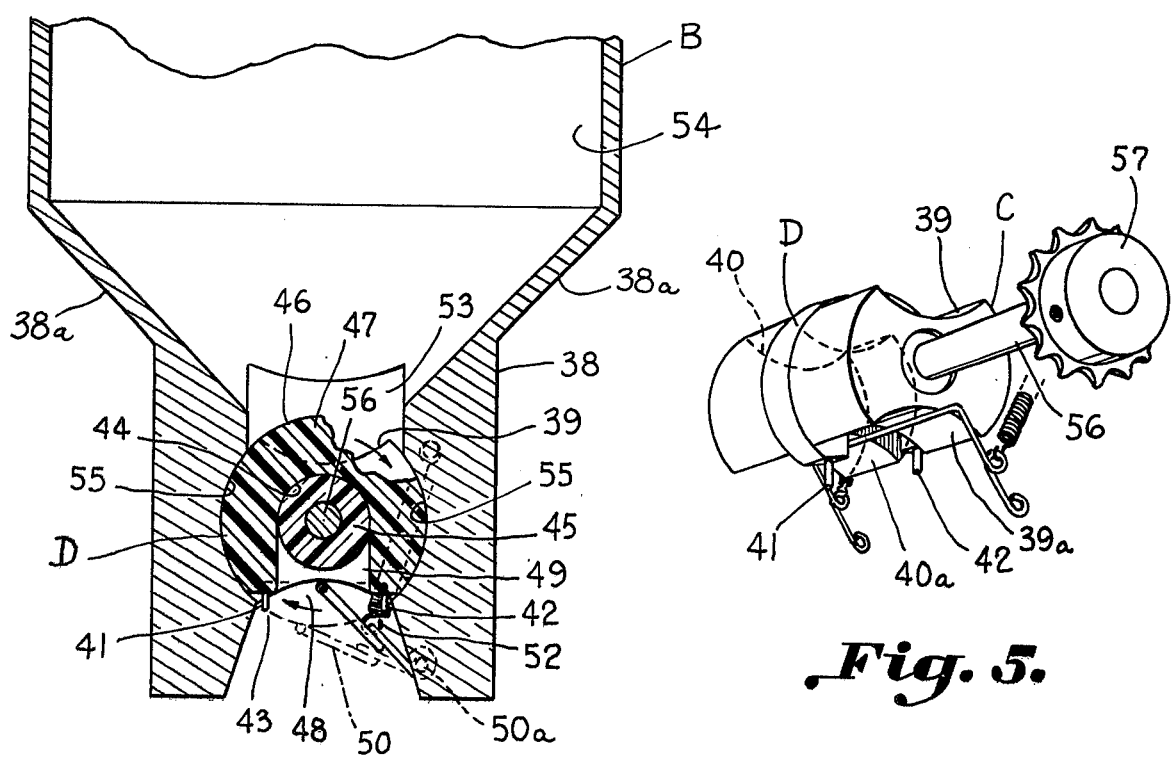
Fig. 4.
Fig. 5.

DOUGH DISPENSING AND SUPPORT APPARATUS

BACKGROUND OF THE INVENTION

Prior devices have been developed for dispensing dough and the like wherein a cylindrical roller having dough receiving recesses dispenses separated dough masses as, for example, the device shown in U.S. Pat. No. 1,777,178. Such prior devices lack the capability of dispensing dough with the speed and uniformity required in the operation of fast-food restaurants and provide little shaping. This is because hushpuppies, for example, in fast-food stores must be prepared in large quantities to meet rush hour requirements. The individual dough masses must all be placed in the cooking oil for deep fat frying within a relatively short period of time otherwise the first hushpuppies placed in the oil will be overcooked in relation to the last.

To reduce this problem, it has been proposed to provide additional dough receiving cavities circumferentially spaced around the roller. However, increasing the number of circumferential cavities limits the size thereof and the size of dough dispensed therefrom. Moreover, the number of dough receiving cavities formed around the circumference of the cylindrical molding means limits the speed at which the molding means may be rotated. This is because the flow characteristics of the viscous or mastic dough prevents the cavities communicating with the dough supply from receiving the dough fast enough to fill them as speed is increased. The size and shape of the desired dough mass and thus the dough cavity also limits the speed of the cylindrical mold. It has been found that by spacing additional cavities axially along the molding means rather than around the circumference of the molding means more rapid dispensing can be had for the more viscous mixtures. This has also been found to facilitate the rapid dispensing of larger dough masses.

Since it is necessary that scraper means enter the cavities to dislodge the dough masses it has heretofore been impractical to provide axially spaced cavities even if such had been contemplated by the prior art. To accommodate the rapid dispensing of dough mixtures of different viscosities, it is desirable to have the capability of changing the number of dough cavities and the speed at which the molding means is rotated conveniently without major alteration of the dispensing apparatus.

Another problem encountered with prior dispensing devices is in the support of the devices adjacent the cooking compartment of an associated appliance whereby the dispensing apparatus may be positioned closely adjacent the cooking compartment when in use and which may be folded out of the way when not in use. Moreover, if the dispenser is relatively distant to the cooking oil during dispensing, the dough elements produce excessive splashing of the grease which is dangerous to operating personnel and which creates cleaning problems. Most of the modern quick-food restaurants are limited in space and require that the cooking appliances be designed and installed in a minimum space while also mounted for convenient operation. It is, therefore, desirable that the dispenser be pivotably mounted near the cooking vessel and placeable therein only a short distance above the surface of the grease and well below the upper lip of the cooking vessel.

Accordingly, an important object of the present invention is to provide a dough dispensing apparatus for forming and dispensing a plurality of uniform dough masses in a rapid manner.

Another important object of the invention is to provide a support and dough dispensing apparatus whereby a dough dispensing device may be folded out of the way for storage and which may also be conveniently movable to a position closely adjacent a cooking compartment for rapidly dispensing dough masses therein.

Still another important object of the present invention is to provide a dispensing apparatus having a rotatable molding means with spaced dough receiving cavities and a stationary separator member between the spaced cavities for separating dough between the cavities to form a plurality of separate dough masses.

Yet another important object of the present invention is to provide a dough dispensing apparatus having a rotatable molding means with spaced dough receiving cavities wherein the number of cavities may be easily varied without changing the other components of the dispensing device.

Another object of the invention is to provide a support assembly for supporting and positioning a dough dispensing apparatus providing a pivotable movement of the dispensing device in horizontal and vertical planes so that the device may be positioned closely adjacent the cooking compartment for rapid dispensing of dough masses without splashing of grease therefrom.

Another important object of the invention is to provide faster dough forming and dispensing apparatus which is power operated to facilitate rapid uniform dough dispensing.

SUMMARY OF THE INVENTION

It has been found that an apparatus having increased dough dispensing capabilities may be provided by utilizing a rotatable molding means with axially spaced dough receiving cavities and a stationary separator disk between the cavities separating dough between the cavities for dispensing a plurality of preshaped dough masses. This combination produces new and unexpected results in that scraper means may enter the axially spaced cavities to dislodge a greatly increased number of dough elements of desired size.

A support assembly connected between a stationary support surface and the dispensing device has plural pivotal connections facilitating raising of the device over a side of a cooking appliance and then permitting lowering thereof to position the dispensing outlet closely above the surface of the oil in the cooking compartment for rapid dispensing of dough masses therein. Thus, convenient storage of the dispenser is provided with a new degree of maneuverability with less danger of burning employees and reducing cleaning requirements.

BRIEF DESCRIPTION OF THE DRAWINGS

The construction designed to carry out the invention will be hereinafter described together with other features thereof.

The invention will be more readily understood from a reading of the following specification, and by reference to the accompanying drawings forming a part thereof, wherein an example of the invention is shown and wherein:

FIG. 3 is an enlarged bottom plan view of the dough dispensing device illustrated in FIGS. 1 and 2, FIG. 4 is a transverse sectional elevation taken on the line 4—4 in FIG. 3, and FIG. 5 is a perspective view illustrating a rotatable molding means and stationary separator disk for use in the dough dispensing apparatus of the present invention.

DESCRIPTION OF A PREFERRED EMBODIMENT

Figure 1:
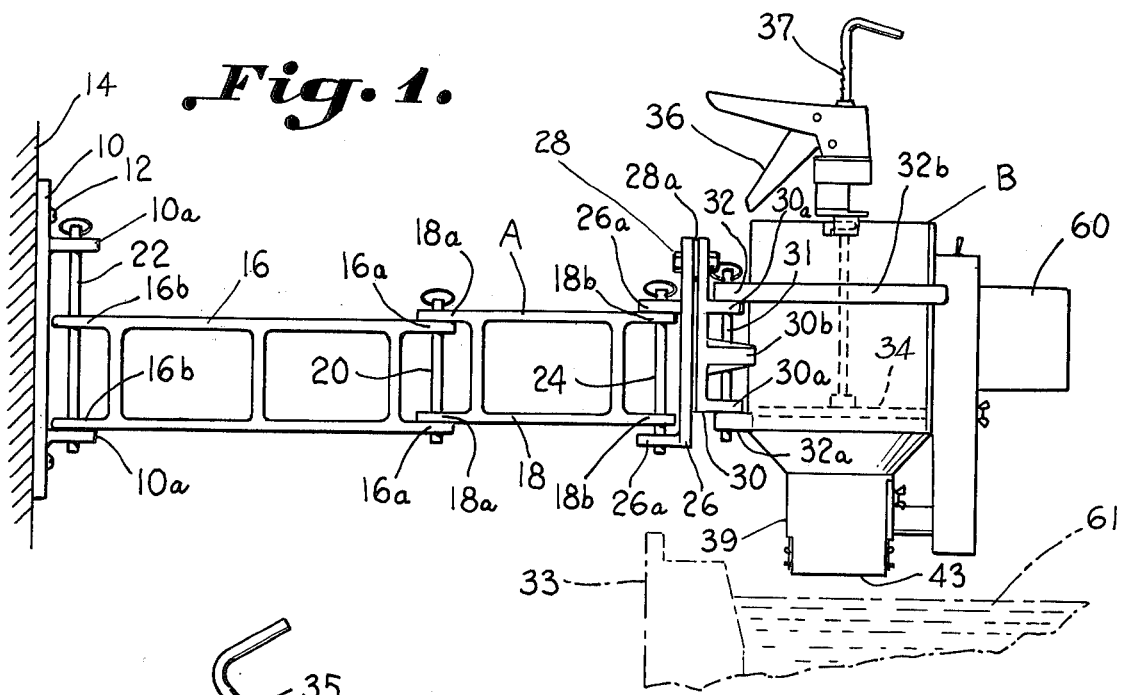
FIG. 1 is a side elevational view illustrating a dough dispensing device and support assembly constructed in accordance with the present invention wherein the dough dispenser is supported with the dispensing outlet within a cooking compartment of an associated appliance closely adjacent the surface of the cooking oil.

The drawings illustrate apparatus for shaping and dispensing dough and the like from a dough containing chamber having a dispensing outlet for dispensing preformed dough masses into a cooking compartment of an associated appliance. The dispensing apparatus includes a support means A for carrying a dough chamber B on a stationary vertical support surface. The support means includes a first pivotable connection providing pivotal movement of the dough chamber in a substantially horizontal plane and a second pivotal connection providing pivotal movement of the dough chamber in a substantially vertical plane. The dough chamber is pivotable about the support means to a raised position for clearing a side portion of the appliance and subsequently pivotable to a lowered position for dispensing. A rotatable cylindrical molding means C is carried horizontally across the dispensing outlet having axial and circumferentially spaced dough receiving cavities formed therein for receiving a mass of dough from the dough chamber. A vertical stationary separator disk D is carried on the cylindrical molding means between the cavities dividing the mass of dough between the cavities to form a plurality of separate dough masses. A central bore is formed within the disk receiving the molding means therein for relative rotational motion. The support means A supports the dispensing outlet in close proximity above the cooking compartment for rapidly dispensing the plurality of dough masses as the dough cavities are rotated.

The support means A is illustrated as including a bracket 10 affixed by means of screws 12 to a stationary support surface such as wall surface 14. A cantilevered support means extends outwardly from the bracket 10 and includes a pair of cantilevered arms 16 and 18 which are pivotably connected together by means of a vertical pin 20 received through aligned openings formed in their vertical aligned connecting ends 16a and 18a, respectively. A pivotable connection between the bracket 10 and the cantilevered support arm 16 is formed by a vertical pin member 22 slideably received through vertically aligned openings in the outwardly extending arms 10a of the bracket and openings formed in the connecting ends 16b of arm 16. A pivotal connection is similarly formed between the cantilevered support means A and the dough chamber B by means of a vertical pin 24 received through aligned openings in the connecting ends 18b of cantilevered arm 18 and the outwardly extending flanges 26a of a second bracket member 26.

Figure 2:
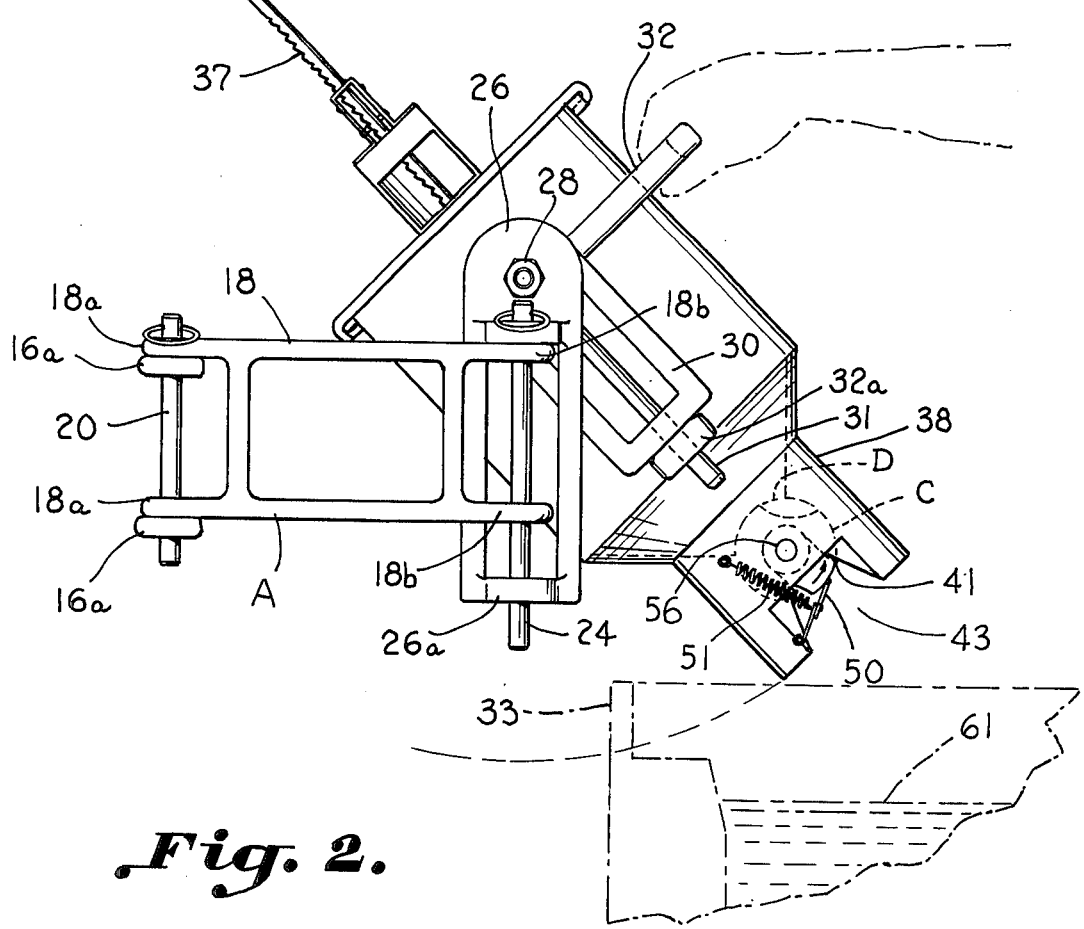
FIG. 2 is an enlarged side elevational view illustrating a dough dispensing apparatus having a pivotable support assembly constructed in accordance with the present invention wherein the dough dispenser is pivoted upwardly for clearing a side portion of a cooking appliance.

As illustrated in FIGS. 1 and 2, the dough chamber B is connected adjacent the free end of the cantilevered support means A by means of horizontal pivotal connection carried by the bracket member 26. The pivot may consist of a horizontal bolt and nut assembly 28 and washers 28a which pivotably connect the bracket 26 with a mounting bracket 30. The mounting bracket 30 is, in turn, connected to the dough chamber B by means of a vertical pin 31 received through aligned holes formed in a pair of spaced flanges 32 and 32a integral with the dough chamber B and openings formed in flanges 30a extended from bracket 30. A pair of circumferentially spaced arms 30b (FIG. 2) integral with the bracket 30 engage the side of the dough container B to prevent any relative movement between bracket 30 and the dough container. Thus, the dough chamber B is permitted pivotable motion in two planes and directions relative to the stationary support surface 14.

A handle 32b integral with chamber B provides convenient control over the movement thereof. As illustrated in FIG. 2, the dough chamber B may be pivoted upwardly to clear a side wall 33 of an associated food preparation appliance such as a deep well fryer. Manual release of the dough container permits its return to a vertical lowered position between the side walls 33 for dispensing dough into the deep well of the appliance in a rapid fashion without splashing the cooking oil therein. When not in use, the dough dispenser B may be folded out of the way compactly owing to the multi-joined cantilevered support means A.

If desired, the pin members 20, 22, 24, and 31 may be provided with wire rings to prevent them from sliding through the openings in which they are inserted as well as providing a means for quickly removing the pins should disassembly of the support means be desired.

A weighted lid coextensive in cross sectional area with the interior of the cylindrical dough containing chamber B may be utilized for pressurizing the dough facilitating its flow toward the dispensing outlet. As illustrated in FIGS. 1 and 2, such a lid portion 34 is carried on a rod 35 which is forced downwardly for pressurizing the dough by means of a trigger 36 which advances the rod downwardly by engaging notches 37 as in a conventional caulking gun. Such pressurization of the dough mixture may be necessary depending upon the viscosity of the dough mixtures which are utilized.

The dough dispensing apparatus is illustrated as including the dough chamber B having a dough dispensing outlet portion 38 across which the rotatable cylindrical molding means C is carried. Axially spaced dough receiving cavities 39 and 40 are formed within the cylindrical molding means C for receiving a mass of dough flowing from the chamber and dispensing the dough through the outlet portion 38. As illustrated, the cavities 39 and 40 are spaced in linear alignment along the axial length of cylinder C and are not in offset alignment in relation to each other. The separator disk D is carried coaxially on the cylindrical molding means C between the spaced cavities 39 and 40 in stationary relation to the chamber B. Abutment means in the form of outwardly projecting pins 41 and 42 are carried by the separator disk D extending from spaced extremities thereof into engagement with walls of the dispensing outlet portion 38 within an outlet opening 43 therein. The disk is preferably formed from a high molecular weight polyethelene such as Delrin type nylon.

As illustrated, the separator disk D has a central bore 44 formed therein for receiving a reduced portion 45 of the molding means C therein. A peripheral portion 46 of the separator disk extends substantially coextensively with the periphery of the molding means C to provide a partition in the form of a separator wall 47 between the dough receiving cavities 39 and 40 for separating the dough mass coming from the container B into separate dough masses.

An innterruption 48 in the periphery of the separator disk D defines an open ended slot 49 which extends radially inward within the disc terminating in the central bore portion 44. Thus, the reduced portion 45 of the molding means is received through the open ended slot 49 for coaxially mounting within the bore 44. The pin members 41 and 42 are imbedded in the separator disk adjacent each side of the slot 49.

The slot in the separator disk between the pins 41 and 42 provides an opening for receiving an elongated scraper blade 50 for separating the dough masses from the cavities 39 and 40. The scraper blade 50 is biased into engagement with the surface of the dough receiving cavities by means of springs 51 and 52.

The dough dispensing outlet 38 is illustrated as having a slotted opening 53 in communication with the interior 54 of the dough containing chamber B. A pair of sides 38a converge from the cylindrical chamber B to the opening 53 to aid the flow of dough therethrough. The cylindrical molding means C is carried longitudinally beneath the slotted opening 53 and rotates within opposed complimentary curved recesses 55 formed in the interior walls of the dispensing outlet portion 38 for containing the cylindrical mold C. Dough is shaped and compressed between the cavity and outlet walls during rotation in this region to eliminate any air pockets in the dough mass which would otherwise fill with grease during cooking and ruin the quality thereof.

As illustrated, the molding means C is affixed to a driven shaft 56 having a sprocket 57 affixed adjacent one end thereof. The entire mold assembly thus formed is received within the curved recesses 55 and is supported in a mounting hub 58. The hub 58 has a hollow spindle 58a rotatably receiving the shaft 56 and a mounting plate 58b for attachment to the outlet portion 38 by means of wingnuts 59. The molding means is then rotated at the desired speed through the sprocket member 57 by means of an electric motor 60 affixed to the side of the chamber B through a chain drive 57a. The mold assembly is rotated at a uniform speed which is optimized for filling and emptying the dough cavities 39 and 40 completely producing dough masses of uniform size and shape as rapidly as possible.

For dispensing dough mixtures, such as hushpuppy mix, a pair of dough cavities 39a and 40a are illustrated spaced 180° from the cavities 39 and 40, respectively. This is an optimum number of circumferentially spaced cavities for a mixture of this viscosity and for a desired size and shape of hushpuppy. It is usually preferred that the hushpuppy be substantially finger shaped and to this end, the dough cavity would be elongated covering, for example, approximately one-third of the circumference of the cylindrical mold. To dispense more than two hushpuppies per revolution or cycle, the additional dough receiving cavities 40 and 40a are provided in an axial direction along molding means C producing four hushpuppies per cycyle. To dispense four hushpuppies with only circumferentially spaced cavities would result in smaller dough masses being dispensed at a slower speed. Faster rotation of the double cavity configuration, without further axial cavities, in order to dispense four hushpuppies in a corresponding length of time would cause an incomplete and imperfect mass of dough to be dispensed resulting in the hushpuppy being ununiformly shaped and cooked. It is highly desirable that the hushpuppies be uniform in shape and amount so as to cook uniformly and maintain the quality thereof.

OPERATION

Assuming the dispensing apparatus is in a storage position with support means A folded against the wall 14, the operator grasps handle 32 and swings the apparatus to the side of the cooking appliance 33. By next pivoting the dough chamber B upwardly over the side 33 and fully extending the cantilevered arms 16 and 18, the dough chamber is lowered with the outlet portion 38 positioned closely above the surface of cooking oil 61. In this position and with the chamber filled with dough, the motor 60 is actuated rotating molding means C at a uniform speed. Trigger 36 is actuated to apply pressure on the dough through lid member 34. The axially aligned dough receiving cavities 39 and 40 receive a mass of dough flowing through the opening 53. The dough mass is divided by the separator disk D between the cavities. The disk D remains vertical and stationary as the molding means C rotates within the bore 44 of the disk. As the dough receiving cavity is turned within the walls of the opposed curved recesses 55, the dough is compressed and shaped therebetween. In this region, the curved exterior surface of disk D and molding means C are flush whereas in the region of opening 53, the disk D extends into the opening 53 and forms the separator wall 47 between cavities. The dough is finally dispensed through the outlet opening 43 as the dough cavities 39 and 40 are rotated as illustrated in FIG. 4. In this position, the blade 50 begins at the forwardmost end of the cavity and scrapes the dough mass from the cavity. Due to the close positioning of the outlet 38, by the support means A, above the level of cooking oil 61, little or no splashing occurs as the dough masses rapidly fall therein.

The molding and separating means C and D of the present invention allows for convenient variations in the number of dough masses dispensed by varying the number of axially spaced cavities. For instance, by removing the double cavity molding means from the shaft 56 and placing upon the shaft a cylindrical molding means having three smaller dough receiving cavities spaced axially along the molding means, three instead of two dough masses are produced each cycle. Of course, any number of cavities may be utilized in the axial direction as long as the space provided in the dispensing outlet 38 permits. For a cylindrical molding means having three cavities, two separator disks D will be utilized. However, since the separator disks are stationary and are open at 48, the scraper blade 50 may be utilized with any number of dough receiving cavities without alteration thereof.

While a preferred embodiment of the invention has been described using specific terms, such description is for illustrative purposes only, and it is to be understood that changes and variations may be made without departing from the spirit or scope of the following claims.

I claim:

1. Dough dispensing apparatus comprising:
  a dough containing chamber having a dough dispensing outlet;
  rotatable cylindrical molding means carried across said outlet having spaced dough receiving cavities formed therein for receiving a mass of said dough flowing from said chamber and dispensing said dough through said outlet as said dough cavity is rotated;

a stationary disk carried between said space cavities:

an annular peripheral portion of said disk extending substantially coextensively with a peripheral portion of said cylindrical molding means providing a separator wall between said cavities for separating said dough mass between said dough cavities;

abutment means carried by said disk extending therefrom into engagement with said chamber adjacent said outlet maintaining said disk stationary in relation to said chamber as said cylindrical molding means is rotated.

2. The structure set forth in claim 1 including a bore within said disk receiving said molding means therein for mounting said disc co-axially with said molding means.

3. The structure set forth in claim 1 wherein said recess opening is defined by an open ended slot in said disk extending radially inward within said disk for receiving said molding means.

4. The structure set forth in claim 3 wherein said abutment means are fixed to said disk adjacent each side of said slot.

5. The structure set forth in claim 3 comprising elongated blade means carried adjacent said dispensing outlet received substantially within said recess opening of said slot and biased toward engagement with a surface of said dough receiving cavities for scraping said dough masses therefrom.

6. The structure set forth in claim 1 comprising pressurization means carried adjacent the top of said dough chamber having a lid portion coextensive with the cross-sectional area of the interior of said dough chamber and movable axially therein for aiding the flow of dough from said chamber.

7. The structure set forth in claim 1 wherein said dough dispensing outlet of said dough chamber includes:

a slotted entrance opening communicating with said dough chamber, an enlarged opening beneath said entrance opening defined by opposed curved recessed surfaces between which said cylindrical molding means is rotatably carried beneath said entrance opening, and said dough received in said dough cavities being shaped between the surface of said dough cavity and said curved recess surface during rotation of said molding means producing uniformly shaped dough masses.

8. The structure set forth in claim 7 including power operated means carried by said dough dispensing device for rotating said cylindrical molding means at a predetermined uniform speed.

9. Dough separating and forming apparatus for use in a dough dispensing device having a dough containing chamber with a dough dispensing outlet, rotatable cylindrical molding means carried horizontally across said outlet having a dough receiving cavity formed therein for receiving a mass of said dough through said outlet as said dough cavity is rotated, said apparatus comprising:

spaced dough receiving cavities formed within said cylindrical molding means for receiving said dough from said chamber, a stationary annular disk carried on said cylindrical molding means between said spaced cavities;

an annular peripheral portion of said disk extending substantially coextensively with a peripheral portion of said cylindrical molding means while providing a separator wall between said cavities for separating said mass of dough between said cavities;

a recess opening in said disc adjacent said dough outlet providing uninterrupted access generally across said dough cavities for entry of scraping means against the surfaces of said dough cavities; and abutment means carried by said disk extending therefrom into engagement with said chamber adjacent said outlet maintaining said disk in stationary relation to said chamber as said cylindrical molding means is rotated.

10. The structure set forth in claim 9 including dough receiving cavities circumferentially spaced 180° from the other of said spaced dough receiving cavities.

11. The structure set forth in claim 9 further comprising a bore within said disk receiving said molding means therein for mounting said disk co-axially with said molding means.

12. Apparatus for dispensing dough and the like from a dough containing chamber having a dispensing outlet for dispensing pre-formed dough masses into a cooking compartment of an associated appliance, said apparatus comprising:

support means for supporting said dough chamber on a stationary support surface including a first pivotable connection providing pivotal movement of said dough chamber in a substantially horizontal plane and a second pivotal connection providing pivotal movement of said dough chamber in a substantially vertical plane;

said dough chamber being pivotable about said support means to a raised position for clearing a side portion of said appliance and subsequently pivotable to a lowered position for dispensing;

rotatable cylindrical molding means carried horizontally across said dispensing outlet having spaced dough receiving cavities formed therein for receiving a mass of said dough from said dough chamber;

a vertical stationary separator disk carried on said cylindrical molding means between said cavities dividing said mass of dough between said cavities to form a plurality of separate dough masses;

a recess opening in said disc adjacent said dough outlet providing uninterrupted access generally across said dough cavities for entry of scraping means against the surfaces of said dough cavities; and said support means supporting said dispensing outlet in close proximity above said cooking compartment for rapidly dispensing said plurality of dough masses as said dough cavities are rotated.

13. A dough dispensing apparatus including:

a dough containing chamber;

a dough outlet portion carried by said chamber for receiving dough flowing from said chamber for delivery through an opening therein remote from the chamber;

opposed cylindrical surfaces in said outlet portion extending thereacross;

a mold carried for rotation between said cylindrical surfaces;

axially spaced aligned cavities carried in said mold;

a parition means supported to be stationary relative to said chamber for separating the dough flowing into the cavities carried between said cavities;

a scraper blade associated with said chamber and extending between said cavities adjacent said opening for dislodging the separated dough from said cavities; and said partition being open at said dough outlet opening permitting entry of said scraper blade against the surfaces of said cavities.

14. The structure set forth in claim 13 including means for movably mounting said dough dispensing apparatus and power operated means carried by said apparatus for rotating said mold at a predetermined speed.

* * * * *